United States Patent

[11] 3,580,440

| [72] | Inventors | William H. Fry;<br>Lawrence G. Zerba, Independence, Iowa |
|---|---|---|
| [21] | Appl. No. | 799,044 |
| [22] | Filed | Feb. 13, 1969 |
| [45] | Patented | May 25, 1971 |
| [73] | Assignee | Construction Machinery Company<br>Waterloo, Iowa |

[54] AUXILIARY CHUTE HOLD-DOWN MEANS FOR A TRUCK MOUNTED CONCRETE MIXER
11 Claims, 6 Drawing Figs.

[52] U.S. Cl. .................................................. 224/42.31,
193/10
[51] Int. Cl. ...................................................... B60r 11/06,
B60p 3/16
[50] Field of Search .......................................... 193/5, 10;
24/263, 263.4, 263 (LL); 248/361; 224/42.31,
42.4, 32, 38, 39, 42.1, (A,B,E), 42.16

[56] References Cited
UNITED STATES PATENTS

| 2,169,453 | 8/1939 | Schenbeck | 193/5 |
| 2,316,290 | 4/1943 | Schenbeck | 24/263 |
| 2,488,292 | 11/1949 | Hilkemeier | 193/10 |
| 2,915,276 | 12/1959 | Lindmark | 24/263.4 |

Primary Examiner—Harvey C. Hornsby
Assistant Examiner—Merle F. Maffei
Attorney—Zarley, McKee & Thomte ABSTRACT: An auxiliary chute holddown means for a truck mounted concrete mixer including a pair of spaced apart support brackets secured to the mixer truck at one side thereof. The brackets are adapted to removably receive the auxiliary chute thereon and are adapted to support the chute in such a position so that one of its side edges is disposed laterally of and above its other side edge. An elongated flexible chain member is secured at one end to the truck between the brackets and has a movable cam lock means secured to its other end which is adapted to engage the uppermost chute side edge. The brackets include lip portions which extend over the other chute side edge to assist in maintaining the chute on the brackets. The cam lock means is movable from an unlocked position with respect to the chute wherein the flexible member is substantially tension free to a locked position with respect to the chute wherein the flexible member is under tension to maintain the chute on the brackets.

PATENTED MAY 25 1971
3,580,440
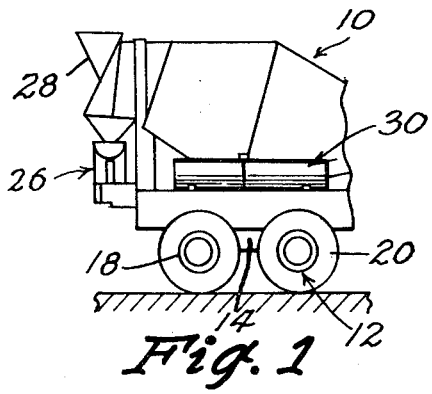
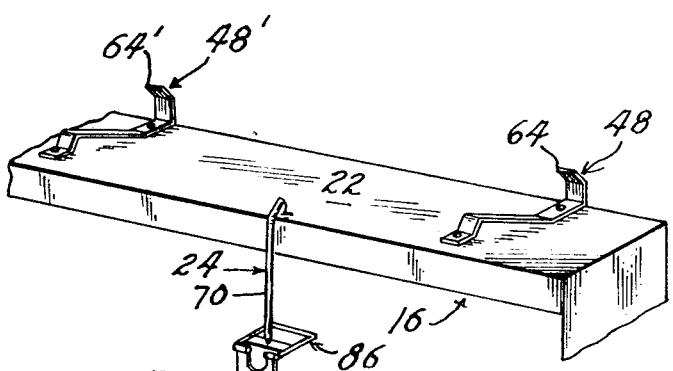
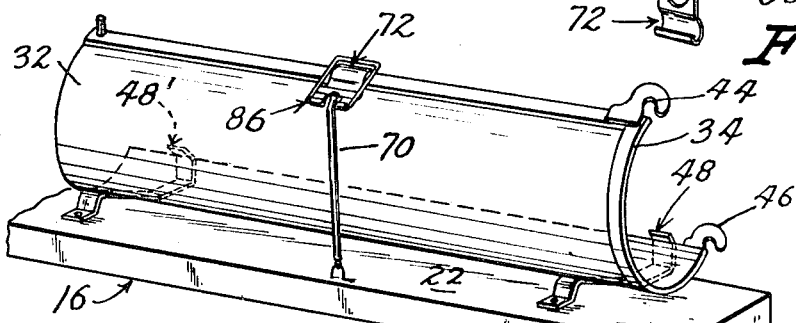
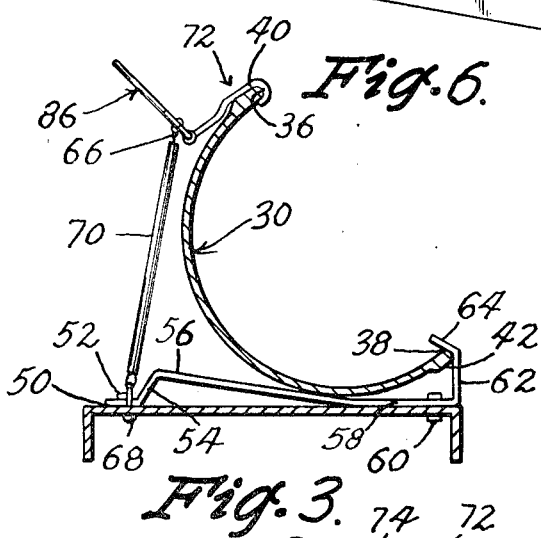
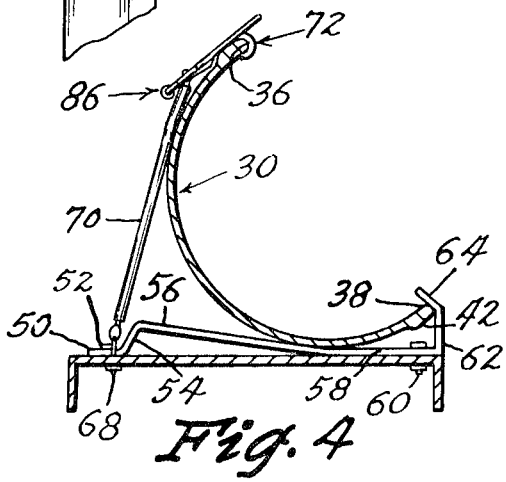
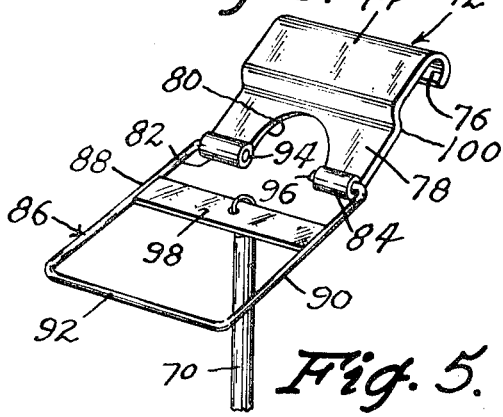
INVENTORS
WILLIAM H. FRY
LAWRENCE G. ZERBA
BY
Jarley, McKee & Thomte
ATTORNEYS

3,580,440

AUXILIARY CHUTE HOLD-DOWN MEANS FOR A TRUCK MOUNTED CONCRETE MIXER

Truck-mounted concrete mixers are usually provided with an auxiliary chute to permit the operator to effectively increase the length of the main discharge chute. The main or primary discharge chute assembly is pivotally connected to the rearward end of the mixer and is folded upon itself and pivoted to one side when not in use. The auxiliary chute must be removed or detached from the primary chute when the truck mixer is being moved from one location to another and the storage of the same during transport has given rise to certain problems. The conventional means for storing the auxiliary chute are not satisfactory due to the difficulty encountered in attaching and removing the auxiliary chute to and from the truck mixer respectively. Some truck mixers do not have any means for storing the auxiliary chute which results in the auxiliary chute merely being placed at one side of the truck mixer drum which permits the auxiliary chute to rattle during transport and which sometimes permits the auxiliary chute to fall from the truck mixer.

Therefore, it is a primary object of this invention to provide an auxiliary chute holddown means for a truck mounted concrete mixer.

A further object of this invention is to provide an auxiliary chute holddown means for a truck mounted concrete mixer which permits the auxiliary chute to be quickly secured to and removed from the concrete mixer.

A further object of this invention is to provide an auxiliary chute holddown means for a truck mounted concrete mixer which stores the auxiliary chute in a position so as to occupy a minimum amount of space.

A further object of this invention is to provide an auxiliary chute holddown means for a truck-mounted concrete mixer which prevents the auxiliary chute from rattling or moving during periods of transport.

A further object of this invention is to provide an auxiliary chute holddown means for a truck-mounted concrete mixer which may be conveniently attached to conventional concrete mixers.

A further object of this invention is to provide an auxiliary chute holddown means for a truck-mounted concrete mixer including a cam lock means which releaseably maintains the auxiliary chute on a pair of spaced apart supporting brackets.

A further object of this invention is to provide an auxiliary chute holddown means for a truck mounted concrete mixer which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a fragmentary side elevational view of the truck mounted concrete mixer illustrating the auxiliary chute being supported on the holddown means;

FIG. 2 is a partial front perspective view of the holddown means of this invention;

FIG. 3 is a front elevational view of the holddown means of this invention illustrating the cam lock means in an unlocked position;

FIG. 4 is a view similar to FIG. 3 except that the cam lock means is illustrated in a locked position;

FIG. 5 is a perspective view of the cam lock portion of this invention in an unlocked position; and FIG. 6 is a perspective view of the device illustrating the auxiliary chute being maintained thereon.

The numeral 10 generally designates a conventional concrete mixer 10 mounted on the truck 12 including a frame means 14. Truck 12 includes a fender portion 16 which extends over the rear wheels 18 and 20 at one side thereof and which is provided with a substantially flat top surface 22. The numeral 24 generally designates the holddown means of this invention and as illustrated in FIG. 2 is secured to the fender 16. It should be noted that the holddown means 24 could be conveniently secured to the truck frame in the event that a fender is not provided on the truck at the rearward end thereof. Mixer 10 is provided wit a conventional chute assembly 26 which is pivotally secured to the rearward end thereof and having its upper end positioned below the discharge portion 28 of the mixer 10. The chute assembly 26 is of conventional construction as is the auxiliary chute 30 which is adapted to be removably attached to the lower end of the chute assembly 26 at times to effectively increase the overall length of the chute assembly during unloading operations.

Auxiliary chute 30 is substantially channel-shaped in cross section and includes opposite ends 32, 34 and opposite side edges 36, 38. As illustrated in FIG. 3, the side edges of the auxiliary chute 30 are provided with reinforcing members 40 and 42 respectively which are merely provided to increase the strength of the side edges. The side edges of the auxiliary chute 30 may be reinforced by bending a portion of the chute back upon itself or by providing a separate reinforcing bar. The auxiliary chute 30 is provided with a pair of hooks 44 and 46 provided at the upper end thereof adapted to facilitate the attachment of the chute 30 to the chute assembly 26.

Holddown means 24 includes a pair of spaced apart support brackets 48 and 48' which are secured to the fender 16 by bolts or the like. Inasmuch as support brackets 48 and 48' are identical, only support bracket 48 will be described with identical structure on support bracket 48' being indicated by ′′ ′ ′′. Support bracket 48 includes a foot portion 50 through which the bolt 52 extends to facilitate the attachment of the bracket to the fender 16. An inclined bracket portion 54 extends upwardly and inwardly from the inner end of the foot 50 as best illustrated in FIG. 4. Bracket portion 56 extends downwardly and inwardly from the upper end of bracket portion 54 and terminates in a horizontal portion 58 through which a bolt 60 extends to aid in attaching the bracket to the fender. An upstanding bracket portion 62 extends upwardly from the inner end of the horizontal bracket portion 58 and is provided with a lip portion 64 which extends upwardly and outwardly with respect thereto as best illustrated in FIGS. 3 and 4.

An elongated flexible member such as a chain 66 is secured at one end to the fender 16 by any convenient means such as a bolt assembly 68. A cover 70 embraces the flexible member 66 for the larger part of its length and is designed to prevent foreign material from becoming encrusted on the chain which would present certain maintenance problems.

The numeral 72 generally refers to a cam lock means which is secured to the other end of the flexible member 66 and which is adapted to be secured to the chute 30 as illustrated in FIGS. 3 and 4. Cam lock means 72 includes a hook member 74 having an arcuate hook portion 76 provided thereon which is adapted to extend over side edge 36 of chute 30 as illustrated in FIG. 3. The configuration of hook member 74 is such that it is complementary to the shape of the side edge 36 and the reinforcing means thereon as best illustrated in FIG. 3. Hook member 74 includes a flat base portion 78 which extends from the hook portion 76 as best illustrated in FIG. 5. Base portion 78 is provided with an arcuate cutout portion 80 provided therein for a purpose to be described hereinafter. The end of flat portion 78 on opposite sides of the cutout portion 80 has been rolled upon itself to provide pair of eyelets 82 and 84. The numeral 86 generally designates a handle portion including opposite side members 88 and 90 and a top member 92 extending therebetween as best illustrated in FIG. 5. Handle portion 86 is provided with end members 94 and 96 which extend inwardly from the other ends of side members 88 and 90 respectively and which are rotatably received in eyelets 82 and 84 respectively. A bar 98 is secured to and extends between the side members 88 and 90 by welding or the like and is secured to the other end of the flexible member 66 as illustrated in FIG. 5. The handle means 86 is pivotally movable with respect to the hook member 74 and is movable from the position of FIG. 3 to the position of FIG. 4. When the handle member has been pivoted from the position of FIG. 3 to the position of FIG. 4, the elongated member 66 extends downwardly through the cutout portion 80.

The holddown means 24 of this invention permits the auxiliary chute 30 to be quickly and conveniently secured to the truck by simply placing the chute 30 on the support brackets 48 and 48' in the manner illustrated in FIG. 6 so that the side edge 38 engages the under side of lip portions 64 and 64'. The configuration of the support brackets 48 and 48' is such that the side edge 36 is positioned upwardly and laterally of the side edge 38. The weight of the auxiliary chute 30 will cause the side edge 38 to bear upwardly against the under side of the lip portions 64 and 64' while the cam lock means 72 is being secured to the chute 30. The hook member 74 is then extended over the side edge 36 as illustrated in FIG. 3 and the handle 86 is then pivoted from the position illustrated in FIG. 3 to the position of FIG. 4 to yieldably lock the auxiliary chute 30 on the support brackets 48 and 48'. The length of the elongated member 66 is such that the hook member 74 may be easily placed over the side edge 36 when the cam lock means is in an unlocked position and will be substantially tension free prior to the cam lock means being moved to its locked position. The pivotal movement of the handle 86 with respect to the hook member 74 causes the upper end of the flexible member 66 to be moved upwardly and laterally from the position of FIG. 3 to the position of FIG. 4 to increase tension in the flexible member 66. The tension in the flexible member 66 tends to pivot the handle 86 in a clockwise direction as viewed in FIG. 4 which yieldably maintains the cam lock means in its locked position. In other words, a camming effect is provided due to the fact that connection between the upper end of the flexible member 66 and the handle 86 is positioned upwardly and inwardly of the pivotal connection of the handle 86 and the hook member 74 when the cam lock means is in its locked position.

The auxiliary chute 30 is easily removed from the mixer by simply grasping the handle 86 and pivotally moving the same in a counter clockwise position as viewed in FIG. 4 from the position of FIG. 4 to the position of FIG. 3 which places the flexible member in a tension free condition so that the hook portion 76 may be removed from the side edge 36. The cam lock means 24 will be supported by the fender 16 when the chute 30 is not mounted on the brackets 48 and 48' due to the connection between the flexible member 66 and the fender 16 as viewed in FIG. 2. The connection of the cam lock means 24 with the fender 16 insures that the cam lock means will not become misplaced or lost when the auxiliary chute is being used. The cam lock means efficiently locks the chute 30 on the support brackets 48 and 48' during periods of transport due to the tension in the flexible member 66 forcing the side edge 38 upwardly against the underside of the lip portions 64 and 64'. The configuration of the hook member 74 is such that the shoulder 100 bears against the outer side of the chute 30 which aids in maintaining the cam lock means 72 in position. Additionally, the flexible member 66 also partially engages the chute 30 as illustrated in FIG. 4 to aid in maintaining the chute in position. Thus it can be seen that the device accomplishes at least all of its stated objectives.

Some changes may be made in the construction and arrangement of our AUXILIARY CHUTE HOLDDOWN MEANS FOR A TRUCK-MOUNTED CONCRETE MIXER without departing from the real spirit and purpose of our invention, and it is our intention to cover by our claims, any modified forms of structure or use of mechanical equivalents which may be reasonably included within their scope.

We claim:

1. An auxiliary chute holddown means for detachably mounting a chute on a portion of a concrete mixer truck, said chute including first and second side edges, said holddown means comprising:

at least one substantially rigid bracket fixed to said portion of said truck, said bracket including a stationary lip portion supported rigidly in spaced relation from said portion of said truck, said lip portion being adapted to engage said first edge of said chute and being positioned so as to limit movement of said first edge away from said portion of said truck;

an elongated member secured at one of its ends to said portion of said truck at a point spaced from said lip portion;

a movable cam lock means secured to the other end of said elongated member said cam lock means including a hook member adapted to retentively engage said second edge of said chute, said cam lock means being movable from an unlocked position wherein said hook member is a predetermined distance from said one end of said elongated member to a locked position wherein said hook member is moved closer to said one end of said elongated member, whereupon movement of said cam lock means to its locked position moves said chute towards said portion of said truck and simultaneously urges said first edge of said chute into rigid engagement with said lip portion.

2. A holddown means according to claim 1 wherein said elongated member is flexible.

3. A holddown means according to claim 1 wherein said bracket includes a support portion between said lip portion and said one end of said elongated member, said support portion being adapted to engage said chute between said first and second edges.

4. A holddown means according to claim 3 wherein the relative positions of said support and lip portions of said bracket are such that said support portion will hold said chute with its first edge engaging said lip portion and with its second edge spaced laterally and upwardly with respect to said first edge, said portion of said truck facing upwardly.

5. A holddown means according to claim 1 wherein said hook member has first and second ends, said first end being adapted to extend over said second edge of said chute, a handle member being pivotally secured at one end to said second end of said hook member, said elongated member being secured to said handle intermediate its ends.

6. A holddown means according to claim 5 wherein said hook member has a cutout portion formed at its said second end adapted to receive said other end of said elongated member.

7. The means of claim 6 wherein the connection between said other end of said elongated member and said handle member is disposed laterally and above the pivotal connection of said handle member and said hook member when said cam lock means is in its locked position and wherein said elongated member extends downwardly through said cutout portion when said cam lock means is in its locked position.

8. The means of claim 7 wherein said elongated member has a length sufficient to permit said hook member to be extended over said one side edge of said chute when said cam lock means is in its unlocked position.

9. The means of claim 8 wherein said brackets are secured to one of the truck fenders, said elongated member being secured at its said one end to said one truck fender between said brackets.

10. In combination at least one elongated bracket having a lip on one of its ends and a support portion between said one end and the other of its ends;

a chute for a truck mounted concrete mixer, said chute having in cross section a first side edge, a second side edge, and substantially arcuate bottom between said first and second edges, said first edge being in engagement with said lip portion and said bottom resting on said support portion of said bracket;

an elongated adjustable tension means having one of its ends detachably connected to said second edge of said chute and having the other of its ends connected to said bracket at a point adjacent the other end of said bracket;

said tension means being under tension so as to press said bottom of said chute against said support portion of said bracket and simultaneously to urge said first edge of said chute into rigid engagement with said lip portion.

11. A combination according to claim 10 wherein said chute is positioned with its second edge elevated with respect to said first edge, said support portion engaging said bottom at a point closer to said first edge than to said second edge so that the weight of said chute urges said first edge against said loop portion.